(12) United States Patent
Rossmanith et al.

(10) Patent No.: US 9,080,604 B2
(45) Date of Patent: Jul. 14, 2015

(54) PLAIN BEARING SHELL WITH SLIDE FACE SURFACE GEOMETRY WHICH IS PROFILED IN THE AXIAL DIRECTION

(75) Inventors: Ralf Rossmanith, Oestrich-Winkel (DE); Stefan Rittmann, Kirchheimbolanden (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 0 days.

(21) Appl. No.: 14/124,932

(22) PCT Filed: May 25, 2012

(86) PCT No.: PCT/EP2012/059853
§ 371 (c)(1),
(2), (4) Date: Feb. 14, 2014

(87) PCT Pub. No.: WO2012/168096
PCT Pub. Date: Dec. 13, 2012

(65) Prior Publication Data
US 2014/0177989 A1 Jun. 26, 2014

(30) Foreign Application Priority Data
Jun. 9, 2011 (DE) .......................... 10 2011 077 278

(51) Int. Cl.
| F16C 9/02 | (2006.01) |
| F16C 25/04 | (2006.01) |
| F16C 33/04 | (2006.01) |
| F16C 17/02 | (2006.01) |
| F16C 23/04 | (2006.01) |
| F16C 33/14 | (2006.01) |
| F16C 9/04 | (2006.01) |

(52) U.S. Cl.
CPC . *F16C 33/04* (2013.01); *F16C 9/04* (2013.01); *F16C 17/022* (2013.01); *F16C 23/041* (2013.01); *F16C 33/046* (2013.01); *F16C 33/14* (2013.01); *F16C 2360/22* (2013.01); *Y10T 408/03* (2015.01)

(58) Field of Classification Search
CPC ............... F16C 33/046; F16C 2260/60; F16C 2260/62; F16C 2260/66; F16C 2260/70; F16C 25/02; F16C 25/04
USPC ............. 29/898.066; 384/272–274, 276, 294, 384/271
See application file for complete search history.

(56) References Cited

U.S. PATENT DOCUMENTS

| 3,612,031 | A | * | 10/1971 | Mazzarelli | .................. 125/11.05 |
| 3,710,466 | A | | 1/1973 | Williamson et al. | |
| 5,707,155 | A | * | 1/1998 | Banfield et al. | ............... 384/295 |
| 6,120,187 | A | * | 9/2000 | Ono et al. | ...................... 384/273 |
| 6,688,001 | B2 | | 2/2004 | Okamoto | |
| 2002/0126924 | A1 | * | 9/2002 | Okamoto et al. | ............. 384/276 |

FOREIGN PATENT DOCUMENTS

| DE | 658929 C | 4/1938 |
| DE | 2223721 A1 | 6/1973 |

(Continued)

*Primary Examiner* — Phillip A Johnson
(74) *Attorney, Agent, or Firm* — Robert L. Stearns; Dickinson Wright, PLLC (57) ABSTRACT

A plain bearing shell includes a slide face of which, in the region of the apex of the plain bearing shell, is convexly curved in the axial direction at least at the edge regions, wherein the curvature is at its most pronounced at the apex of the plain bearing shell and decreases continuously in the circumferential direction of the plain bearing shell toward the two partial surfaces. A method for producing such a plain bearing shell is also provided.

13 Claims, 5 Drawing Sheets

(56) References Cited

FOREIGN PATENT DOCUMENTS

| | | | |
|---|---|---|---|
| DE | 10208118 | A1 | 2/2002 |
| DE | 10305461 | A1 | 8/2004 |
| EP | 1473475 | A1 | 11/2004 |
| JP | 2005155655 | A | 6/2005 |
| JP | 2007260829 | A * | 10/2007 |
| JP | 2007279967 | A | 10/2007 |
| JP | 2008144932 | A | 6/2008 |

* cited by examiner

PLAIN BEARING SHELL WITH SLIDE FACE SURFACE GEOMETRY WHICH IS PROFILED IN THE AXIAL DIRECTION

BACKGROUND OF THE INVENTION

1. Technical Field

The invention relates to a plain bearing shell having a slide face which is partially convexly curved. The invention also relates to a method for producing a plain bearing shell of this type.

2. Related Art

The machining of the slide faces of bearing shells is carried out by drilling out the bearing shells. This involves a drill spindle rotating at a rotation speed X (rev/min) and moving at a feed rate Y (mm/rev) in the axial direction of the bearing shell to be machined. The drilling out is carried out, for example, using a drill spindle with two cutting cartridges positioned opposite one another at 180° being installed in the spindle head thereof.

The drill spindle comprises a first cutting cartridge for cutting a bearing shell to a certain wall thickness (continuously or non-continuously) and, optionally, a second cutting cartridge for forming so-called exposed regions. An exposed region is to be understood as a region at the ends of the bearing shell or in the region of the partial surfaces, in which the wall thickness of the bearing shell is reduced as compared to the wall thickness of the rest of the bearing shell. In this way, it is possible to reduce the wear of a shaft running in the bearing shell, which is due to inaccuracies at the joins of the two bearing shells forming a bearing. The two cutting cartridges positioned opposite one another at 180° are arranged so as to be axially displaced on the spindle head. It is possible to adjust the diameter of the cutting circle when the drill spindle is idle.

During the machining process, the two cutting cartridges are fixed in position with respect to their axial direction, i.e. in the radial direction of the drill spindle.

As a result of the precisely linear feed movement of the drill spindle, a slide face surface geometry also machined in a precisely linear manner is created on the plain bearing shell.

Figure 1:
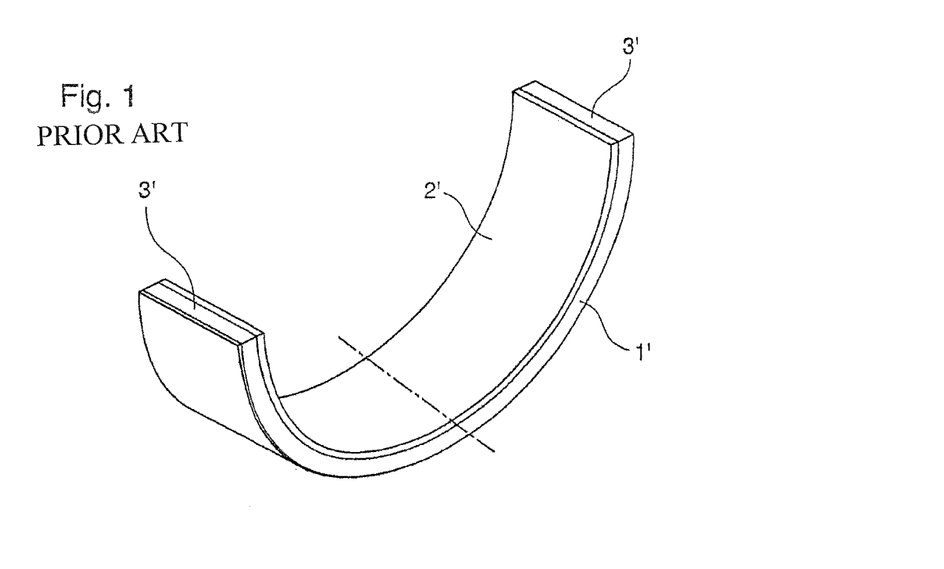
FIG. 1 shows a prior art bearing shell having a linearly machined, profile-free slide face.
Figure 2:
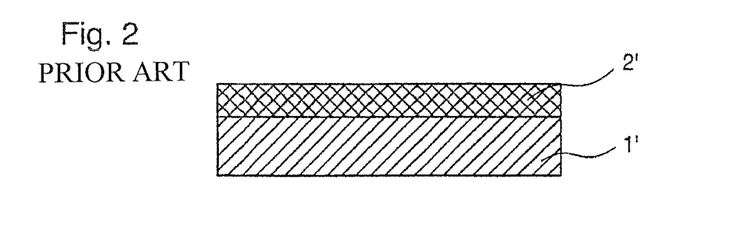
FIG. 2 shows the cross section through the prior art bearing shell according to FIG. 1.

Such a bearing shell 1' is shown in FIG. 1. The profile-free slide face is designated with 2' and the two partial surfaces at the edge regions of the bearing shell 1' are designated with 3'. A cross section through the conventional profile-free bearing shell (along the dashed and dotted line shown in FIG. 1) is shown in FIG. 2. The slide face 2' is flat along the axial direction of the bearing shell.

Figure 4:
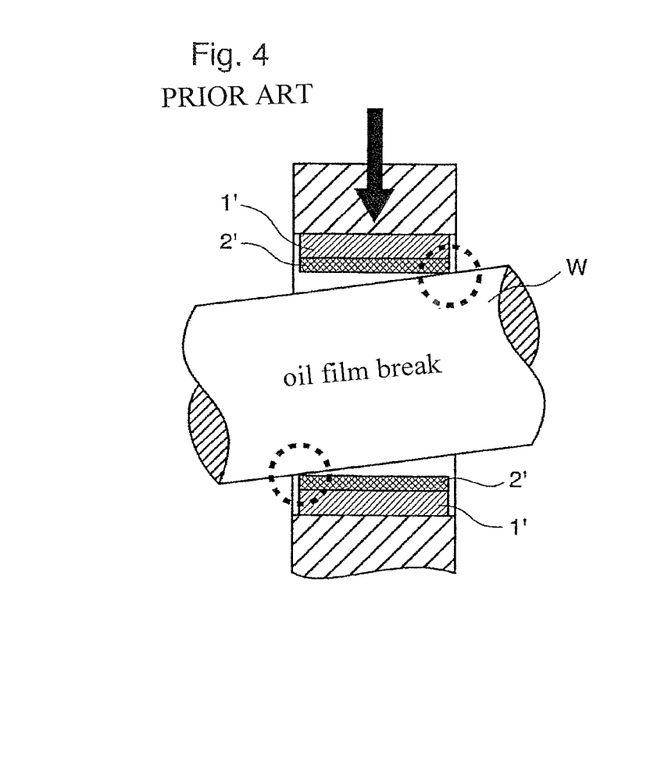
FIG. 4 shows schematically a shaft tilted toward the bearing, the bearing having a linearly machined, profile-free slide face according to the prior art.

Particularly in combustion engines, very high loads occur until the contact between the outer regions of the plain bearing shell, viewed in the axial direction of the plain bearing shell, and the shaft. High oil pressures between the outer regions of the plain bearing shell, in the axial direction of the plain bearing shell, and the shaft lead to a great deal of oil loss at the plain bearing position during operation. The tearing of the oil film between the plain bearing shell and the shaft results in an extremely high level of wear and material fatigue in the region of the contact zone between the plain bearing shell and the shaft. One cause for the wear of the slide face at the bearing and the shaft contained therein is a minimal bending or tilting of the shaft under a load, as shown schematically in FIG. 4 with a greatly exaggerated tilting of the shaft W. If the bearing is a connecting rod bearing or a main bearing in a combustion engine that is subject to high loads, these uneven loads of the shaft on the bearing ultimately have an adverse effect on the operating performance of the engine. In particular, serious deficiencies having a considerable effect on the operating state of an engine may occur particularly in the regions of the plain bearing shell that are subject to the highest loads, the apex of the plain bearing shell. The deficiencies caused by this may lead to disruptions to the operating state of the engine or even to a complete breakdown of the engine.

Figure 3:
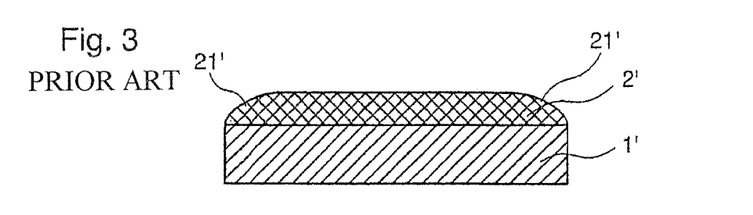
FIG. 3 shows the cross section through a prior art bearing shell having a slide face profile rounded off at the edge regions.
Figure 5:
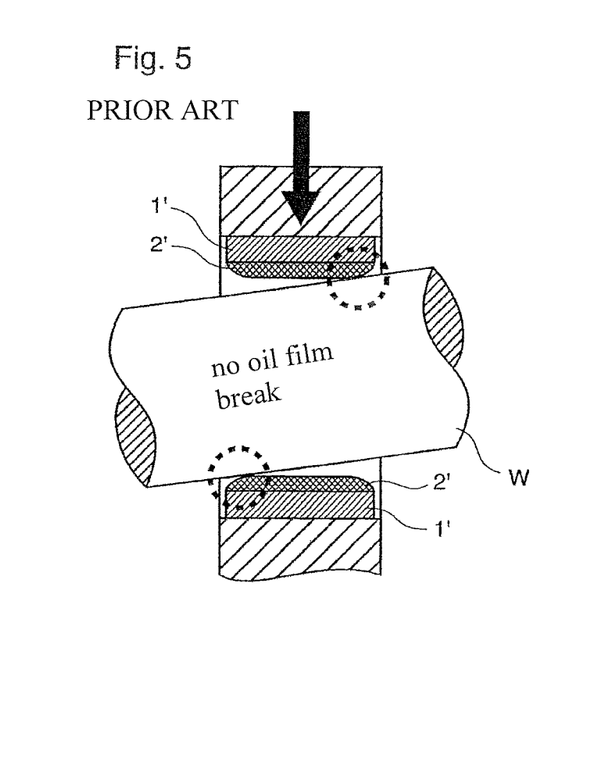
FIG. 5 shows schematically a shaft tilted toward the bearing, the bearing having a slide face profile rounded off at the edge regions according to the prior art.

According to DE 102 08 118 A1, this problem is conventionally solved by configuring the two end portions of the plain bearing (viewed in the axial direction of the bearing) to be round, as shown in FIGS. 3 and 5. The curvature at the edge regions 21' prevents the end portions of the plain bearing from striking against each other when the crank pin or the shaft bends under a load.

According to DE 102 08 118 A1, in addition to the problem of the shaft bending under a load, the problem of the deformation of the bearing under a load must also be taken into consideration. In the middle portion of the plain bearing, viewed in the axial direction, there is a higher oil pressure than in the edge regions. The location-dependent oil pressure causes the slide face of the bearing to be concavely deformed such that even if the slide face is configured to be round at the edge regions, the oil film may tear. However, a greater degree of roundness is not consistent with maximizing the load-bearing region.

To solve this problem, which is to be distinguished from the tilting or bending of the shaft, DE 102 08 118 A1 proposes a plain bearing comprising a cylindrical bearing surface and an inclined end portion on each axial end face of the bearing surface. The inclined surface extends from a certain axial position of the bearing surface to the edge, viewed in the axial direction of the bearing, with the axial length of the inclined surface along the circumference of the cylindrical bearing surface varying. The axial length of the inclined surface in the circumferential direction of the bearing is adapted to the deformations which may occur under the load of the sliding layer. In one embodiment, the axial length of the inclined surface is selected such that it is longest at the apex of the bearing shell and shorter toward the circumferential ends of the bearing shell. By choosing the degree of the slant and the axial length of the slant at the end regions, compensation for the deformation of the bearing shell owing to the oil pressure is sought.

To be distinguished from this is the problem mentioned above of the bending or tilting of the shaft in the bearing, which is conventionally dealt with by rounding off the ends of the bearing shell over the entire circumference of the bearing. A slight rounding off of the ends of the bearing shell does not sufficiently solve the problem of the oil film tearing owing to the bending or tilting of the shaft. However, a very round configuration of the slide face reduces the guiding accuracy of the shaft in the bearing.

SUMMARY OF THE INVENTION

One object of the invention is to provide a bearing shell with which there is a reduced probability of an oil film tear in the edge region of the bearing shell (viewed in the axial direction) owing to the bending or tilting of a shaft positioned therein, while at the same time the guiding accuracy of the shaft in the bearing is maintained. A further object of the invention is to provide a method for producing such a bearing, with which the profiling of the slide face can additionally be realized with reduced effort.

The plain bearing shell according to the invention comprises a slide face which is convexly curved in the axial direction in the region of the apex (viewed in the circumferential direction of the bearing shell) and at least at the edge regions. The curvature is most pronounced at the apex and decreases continuously in the circumferential direction of the plain bearing shell toward the two partial surfaces. Owing to the bending or tilting of the shaft that occurs during operation, it is sufficient to implement the sloping geometry most markedly at the apex of the plain bearing shell. Thus, regions of the slide face remain, away from the apex region, in which the slide face is only slightly curved or is not curved at all. The guiding of the shaft is therefore improved as compared with a slide face continuously curved in the circumferential direction. The convex curvature reduces the likelihood of a tear in the oil film in the edge regions of the bearing. As a result of the curvature, in contrast to an incline of the end regions directed at the deformation of the bearing, different tilting angles and/or degrees of bending of the shaft are taken into consideration. In this way, increased play between the shaft and the slide face owing to wear, which has a direct influence on the tilting angle and bending amplitude that occurs, is taken into account.

Preferably, the curvature continuously tapers off to zero in the circumferential direction such that no convex profiling is provided on the two partial surfaces. This further improves the guiding accuracy of the bearing. Moreover, exposed regions, which indicate a reduction in the wall thickness of the bearing shell in the regions of the partial surfaces, can be particularly easily integrated in this way. The exposed regions prevent inaccuracies at the joins of the two bearing shells leading to the inner edge of a partial surface at a join protruding inwardly, particularly in view of the fact that the bearing shells are pressed together with high pressure in order to form a bearing. As a result of this, the operating characteristics of the shaft are improved and a reduction in the wear of the bearing of the shaft is achieved. For the production of the exposed regions, the drill spindle comprises a second cutting cartridge in addition to the first cutting cartridge for cutting the bearing shell to a certain wall thickness (continuously or non-continuously). The first cutting cartridge is preferably arranged so as to be offset behind the second cutting cartridge in the feed direction of the tool. Preferably, the two cutting cartridges are mounted on the drill spindle such that they are opposite one another at 180°. Exposed regions can be formed at the ends of the bearing shell by positioning the second cutting cartridge in a suitable manner and inclining the drilling tool with respect to the bearing shell axis during machining.

Preferably, the slide face of the bearing shell is curved in the axial direction at the edge regions and is flat therebetween, the transition between the curved region and the flat region being continuous. In this way, the guiding accuracy of the bearing shell is increased. Avoiding a non-continuous transition between the flat region and the curved region reduces the probability of a tear in the oil film in the transition region since a non-continuous transition in the case of a tilting or bending of the shaft has a similar effect to the edge of a linear, non-round slide face.

Preferably, the curvature radius in the edge regions, viewed in the axial direction, is constant. In other words, in addition to the flat region, for which no curvature radius is defined, the bearing shell comprises in the axial direction a curvature having a constant curvature radius in the edge regions. In this way, the construction of the bearing shell and the production of the same are simplified. A constant curvature radius causes, in contrast to a slant, an increasing reduction in the thickness of the bearing shell toward the edge. Various tilting angles and/or degrees of bending of the shaft are compensated for in this way.

Preferably, the curvature radius in the edge regions, viewed in the axial direction, changes. By means of a changing curvature radius the amount of the change in thickness, i.e. the magnitude of the increase in the reduction, in the edge region can be better adjusted to an individual distribution of various tilting angles or degrees of bending of the shaft. Preferably, the change is constant.

The slide face of the bearing shell is preferably curved in the axial direction over the entire width, the curvature being continuously convex. With a continuously convex curvature, the probability of a tear in the oil film as a result of the tilting or bending of the shaft is minimized. Furthermore, sufficient guiding accuracy of the bearing shell is ensured by the curvature decreasing in the circumferential direction and, optionally, tapering off entirely toward the partial surfaces.

Preferably, the curvature radius in the axial direction over the entire width is constant in order to ensure, with a simple method of production, good adjustability to various pitches of the shaft relative to the axial direction of the bearing shell.

Preferably, the curvature radius in the axial direction changes from the inside to the outside in order to compensate for an individual distribution of various tilting angles or degrees of bending of the shaft during operation. Preferably, the change is constant.

The reduction in thickness of the slide face in the region of the apex (viewed in the axial direction) is preferably 2 μm to 8 μm. This selection has proved to be an excellent compromise between tilting angle compensation and guiding stability particularly with connecting rod bearings in combustion engines.

The tool for producing a bearing shell as described above comprises a cylindrical drill spindle driven by a rotary drive. The drill spindle rotates around an axis of rotation and comprises at least one first cutting cartridge which is mounted or attached onto the drill spindle at the outer circumference. The spindle may, as described above, comprise a further cutting cartridge for forming exposed regions or for producing a microstructure. During the machining of the bearing shell blank, a cutting region of the cutting cartridge comes into contact with the sliding layer of the blank and, when the drill spindle rotates, cuts the bearing shell to a certain wall thickness (continuously or non-continuously), by which the actual slide face is also produced at the same time.

To produce a plain bearing shell according to the invention, a blank is first of all clamped in a holding fixture for drilling. The manufacture of the slide face takes place by means of overlapping two relative movements between the drill spindle and the bearing shell blank. In addition to the rotation of the drill spindle, a first relative movement takes place, a linear relative movement of the bearing shell blank and the drill spindle along the axial direction of the bearing shell to be produced for finish-drilling the slide face of the bearing shell, and a second relative movement of the bearing shell blank and the drill spindle overlapping and perpendicular to the first movement, such that a bearing shell having a round slide face is produced.

The two relative movements, i.e. the axial relative movement and the relative movement perpendicular thereto, can be generated using a fixed or stationary holding fixture for drilling or a fixed or stationary rotating drill spindle. Also conceivable is a mixture such that the drill spindle being used performs, in addition to its rotation movement, a vertical movement overlapping at the same time the feed movement of the holding fixture for drilling. Conversely, the drill spindle being used may perform, in addition to its rotation movement, a feed movement overlapping at the same time the vertical movement of the holding fixture for drilling.

A radial movement of the entire drill spindle for profiling the slide face can even be dispensed with if the first cutting cartridge can be adjusted in the axial direction thereof by means of adjustment means during operation of the tool. The adjustment direction differs from the direction of the axis of rotation such that the adjustment direction has a non-disappearing component in the direction perpendicular to the axis of rotation. In this way, the convex curvature can be realized in a targeted manner during the drilling out of the bearing shell.

In all of the methods of production mentioned above, finish-drilling the slide face with simultaneous profiling and, optionally, forming of exposed regions is possible in a single operation.

DETAILED DESCRIPTION

Figure 6:
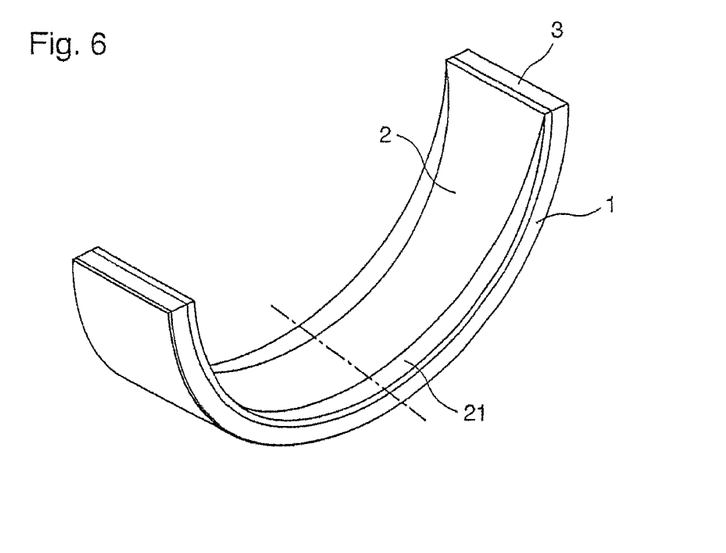
FIG. 6 shows a bearing shell having a slide face profile rounded off convexly at the edge regions, the convex curvature tapering off toward the partial surfaces.

FIG. 6 shows a bearing shell 1 having a slide face profile 21 rounded off convexly at the edge regions (viewed in the axial direction of the bearing shell 1), the convex curvature tapering off toward the partial surfaces 3.

As a result of the curvature 21 at the edge regions, the impacts of a bending or tilting of a shaft in the bearing shell 1 operating under a load are mitigated with respect to wear and operating characteristics since the probability of an oil film tear at the edge of the bearing shell 1 is reduced. It should be noted that the curvature in FIGS. 3, 5, 6 and 7A to 7D is greatly exaggerated for illustrative purposes.

(Section A-A)

Figure 7A:
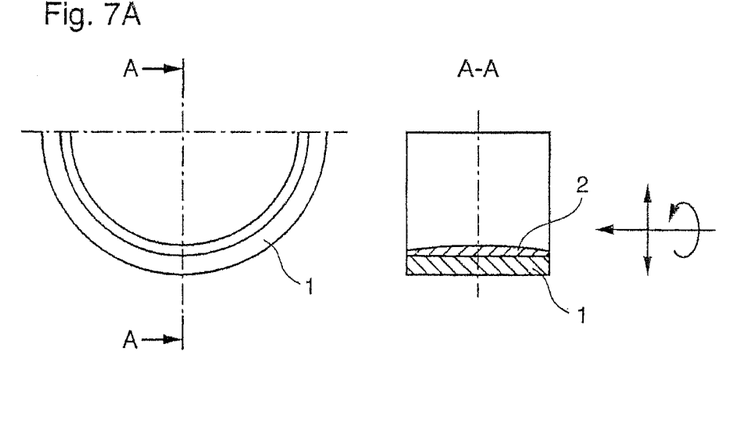
FIG. 7A shows a bearing shell having a slide face profile with a constant curvature radius.

According to FIG. 7A, the profile of the slide face 2 at the apex of the plain bearing shell 1 is convexly curved in the axial direction over the entire length thereof with a constant curvature radius. This profile continuously decreases and tapers off toward the two partial surfaces 3 in the circumferential direction of the plain bearing shell 1.

(Section B-B)

Figure 7B:
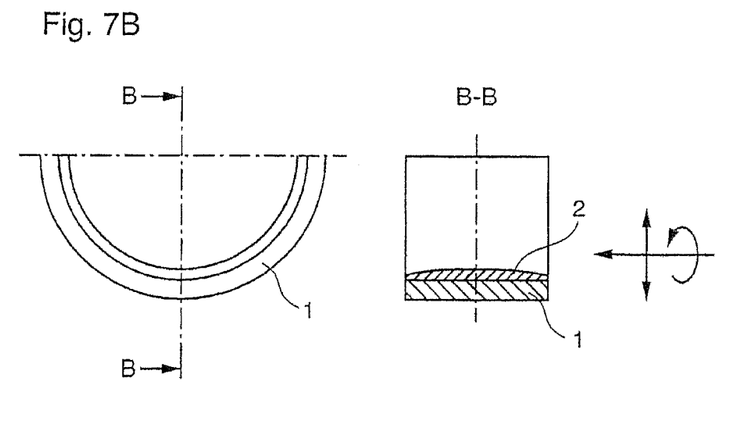
FIG. 7B shows a bearing shell having a slide face profile with a constantly changing curvature radius.

In a further embodiment, the profile according to FIG. 7B is, at the apex of the plain bearing shell 1, convexly curved in the axial direction over the entire length thereof with a constantly changing curvature radius. This profile continuously decreases and tapers off toward the two partial surfaces 3 in the circumferential direction of the plain bearing shell 1.

(Section C-C)

Figure 7C:
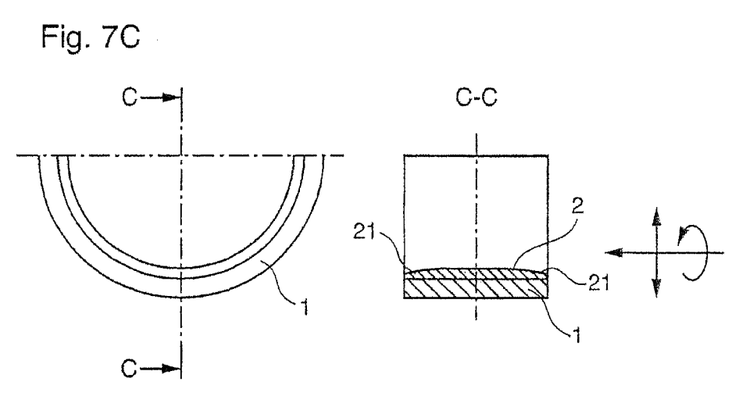
FIG. 7C shows a bearing shell having a slide face profile with a constant curvature radius and a flat region.

In a further embodiment, the profile of the slide face 2 of a plain bearing shell 1 according to FIG. 7C is, at the apex, convexly curved in the axial direction in the edge regions 21 with a constant curvature radius. Between the two convexly curved edge regions 21 the slide face 2 is flat. The transition from the curved region to the flat region of the slide face 2 is continuous. This profile also continuously decreases and tapers off toward the two partial surfaces 3 in the circumferential direction of the plain bearing shell 1.

(Section D-D)

Figure 7D:
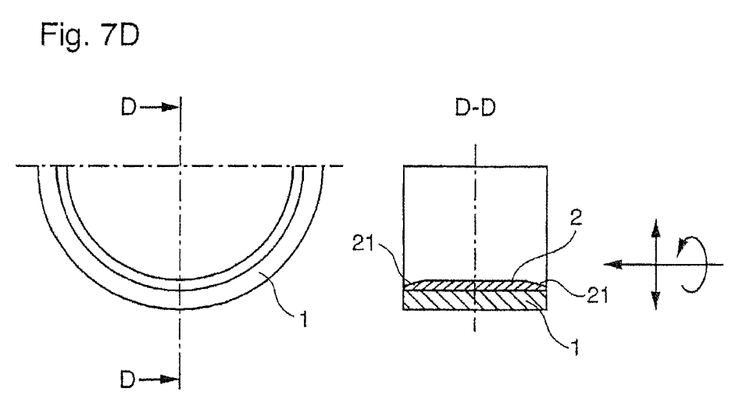
FIG. 7D shows a bearing shell having a slide face profile with a constantly changing curvature radius and a flat region.

In a further embodiment, the profile of the slide face 2 according to FIG. 7D is, at the apex of the plain bearing shell 1, convexly curved in the axial direction in the edge regions 21 with a constantly changing curvature radius. Between the two convexly curved edge regions 21 the slide face 2 is flat. The transition from the curved region to the flat region of the slide face 2 is continuous. This profile also continuously decreases and tapers off toward the two partial surfaces 3 in the circumferential direction of the plain bearing shell 1.

For the production of the bearing shell, a drill spindle is used which comprises a first cutting cartridge and, optionally, a second cutting cartridge for forming exposed regions.

For the production of the profiled slide face 2 of a bearing shell blank clamped in a holding fixture for drilling, the drill spindle being used performs, in addition to its rotation movement, a feed movement and a vertical movement overlapping this feed movement to be performed simultaneously. For this, the plain bearing shell blank to be machined is preferably held in a stationary or still holding fixture for drilling.

Alternatively, the feed movement and the vertical movement to be performed simultaneously can also be performed by the holding fixture for drilling. In this case, the drill spindle being used only performs its rotation movement and beyond that it is stationary.

A further alternative is achieved by the drill spindle being used performing, in addition to its rotation movement, a vertical movement overlapping at the same time the feed movement of the holding fixture for drilling.

A further alternative is achieved by the drill spindle being used performing, in addition to its rotation movement, a feed movement overlapping at the same time the vertical movement of the holding fixture for drilling.

Alternatively, the first and/or second cutting cartridge can be provided on the drill spindle in a radially movable manner. The cutting cartridges can, for example, be braced against piezo elements. By means of a corresponding actuation of the piezo element or piezo elements (in the case of a plurality of cutting cartridges), the piezo element expands and therefore changes the position of the cutting cartridge, largely in the radial direction of the drill spindle. In this way, the described profiling can be produced without a vertical movement of the entire drill spindle or the holding fixture for drilling; rather, it can be produced merely by raising and lowering the cutting cartridge or cartridges.

The invention claimed is:

1. A plain bearing shell, having a slide face of which, in the region of apex of the plain bearing shell, the slide face is convexly curved in an axial direction of the bearing shell at least at the edge regions of the slide face; and wherein the convex curvature is most pronounced at the apex of the plain bearing shell and decreases continuously in the circumferential direction of the plain bearing shell toward two partial end surfaces of the bearing shell.

2. The plain bearing shell according to claim 1, wherein the curvature in the circumferential direction continuously tapers off to zero such that no convex profiling is provided at least at the two partial end surfaces.

3. The plain bearing shell according to claim 1 wherein the slide face of the plain bearing shell is convexly curved in the axial direction at the edge regions and is flat therebetween, and the transition between the curved region and the flat region is continuous.

4. The plain bearing shell according to claim 3, wherein the curvature radius in the axial direction in the edge regions is constant.

5. The plain bearing shell according to claim 3, wherein the curvature radius in the axial direction in the edge regions changes.

6. The plain bearing shell according to claim 1 wherein the slide face of the plain bearing shell is curved in the axial direction over the entire width, the curvature being continuously convex.

7. The plain bearing shell according to claim 6, wherein the curvature radius in the axial direction over the entire width is constant.

8. The plain bearing shell according to claim 6, wherein the curvature radius in the axial direction changes from the inside to the outside.

9. The plain bearing shell according to claim 1, wherein there is a thickness reduction of the slide face of between 2 μm and 8 μm in the convexly curved edge regions.

10. A method for producing a plain bearing shell using a rotating drill spindle, comprising the following steps:
   a) clamping a bearing shell blank in a holding fixture for drilling;
   b) overlapping a relative, linear movement of the bearing shell blank and the drill spindle along the axial direction of the plain bearing shell to be produced for finish-drilling a slide face of the plain bearing shell with a relative movement perpendicular thereto of the bearing shell blank and the drill spindle such that a plain bearing shell having a round slide face is produced.

11. The method according to claim 10, wherein the holding fixture for drilling is stationary and the two relative movements are generated by moving the drill spindle.

12. The method according to claim 10, wherein the drill spindle is stationary and the two relative movements are generated by moving the holding fixture for drilling.

13. The method according to claim 10, wherein the drill spindle comprises at least one cutting cartridge radially adjustable during operation of the drill spindle such that the plain bearing shell having the round slide face is produced.

* * * * *